Figure 1A:
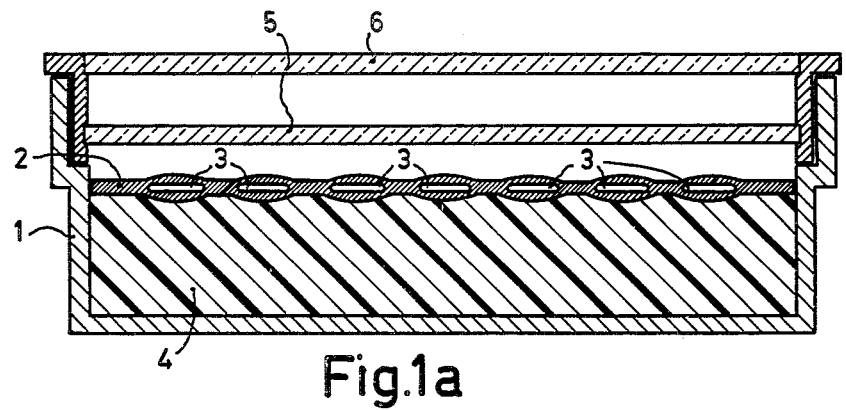

United States Patent [19]

De Grijs

[11] 4,194,493
[45] Mar. 25, 1980

[54] SOLAR COLLECTOR

[75] Inventor: Johan C. De Grijs, Eindhoven, Netherlands

[73] Assignee: U.S. Philips Corporation, New York, N.Y.

[21] Appl. No.: 882,576

[22] Filed: Mar. 2, 1978

[30] Foreign Application Priority Data

Apr. 7, 1977 [NL] Netherlands .......................... 7703837

[51] Int. Cl.² ................................................. F24J 3/02
[52] U.S. Cl. .................................................... 126/442
[58] Field of Search ......................... 126/271; 137/171

[56] References Cited

U.S. PATENT DOCUMENTS

| 3,995,804 | 12/1976 | Folds et al. | 126/271 |
| 4,027,821 | 6/1977 | Hayes et al. | 126/271 |

Primary Examiner—Carroll B. Dority, Jr.
Attorney, Agent, or Firm—Thomas A. Briody; William J. Streeter; Rolf E. Schneider

[57] ABSTRACT

A solar collector comprising a heat exchanger duct through which a heat transport liquid is conducted is arranged during operation at an angle relative to the horizontal. An upper portion of this heat transport liquid duct thereby provides a gas collecting reservoir, downstream whereof such duct is formed with a constriction in which a lower pressure prevails. An exhaust duct is in open communication between the gas collecting reservoir and such constriction and removes gas from the reservoir by the passage of the heat transport liquid through the constriction due to the resulting Venturi effect.

3 Claims, 10 Drawing Figures

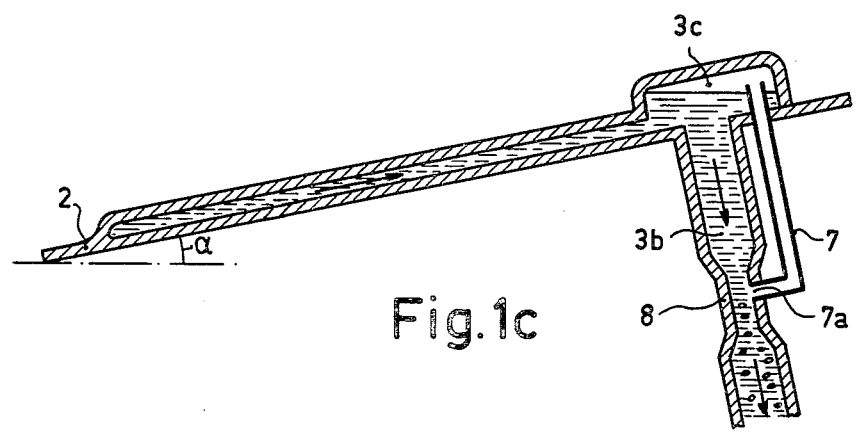
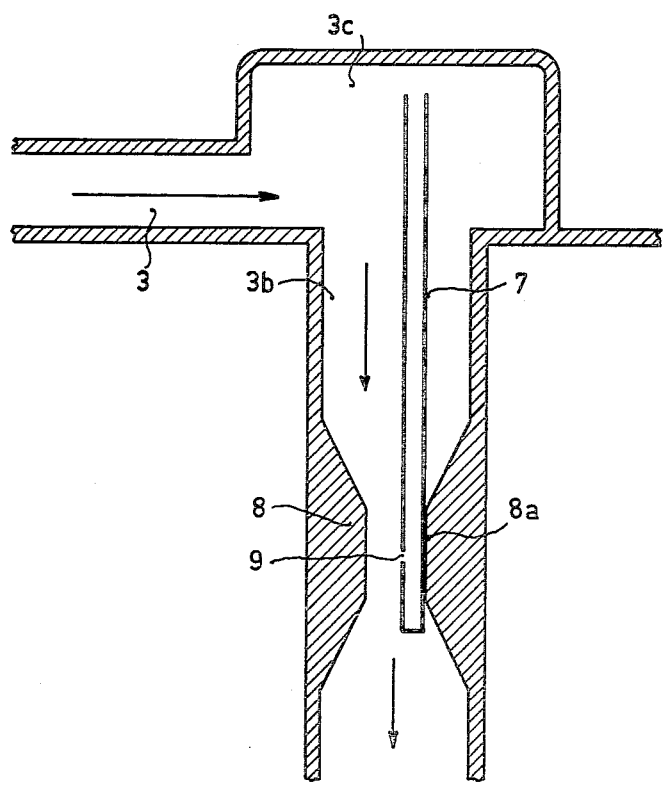

SOLAR COLLECTOR

This invention relates to a solar collector, comprising at least one heat exchanger, including at least one duct, for transferring heat obtained from incident solar radiation during operation to a liquid heat transport medium which is conducted through the duct and which contains a gas, the solar collector being arranged at an angle relative to the horizontal during operation and having an upper duct portion which constitutes a collecting reservoir for gas released from the liquid heat transport medium.

Known solar collectors have a variety of constructions (flat plate; tubular; composite modules etc.) and are often mounted on the sloping roof of a building, such as a house, in a plane parallel to the plane of the roof (see, for example, U.S. Pat. Nos. 3,859,980; 3,937,208; 3,952,724; 3,960,136; 3,965,972; 3,974,822; 3,980,071).

Because of such inclined position of the solar collector, the use of a liquid as the heat transport medium usually imposes a problem in that gas which is dissolved in the liquid or which is present therein in the form of bubbles collects in the upper portion of the solar collector, so that the flow of liquid is impeded and is even likely to be completely blocked. This is notably the case when use is made of water which always contains some air. The air not only impedes proper passage of the water, but may also cause corrosion of the walls of the flow ducts.

The problem imposed by the collecting of gas can be solved by the provision of a de-aerating valve at the highest point of the solar collector. This should not be a manually operated valve, but rather an automatic de-aerating valve, because checking as regards the formation of air bubbles in the solar collector is not possible. This is because the formation of air bubbles becomes manifest only if the circulation of the water through the solar collector stagnates.

However, the mounting of an automatic de-aerating device on the roof of a house imposes a variety of problems. The de-aerating device is subject to corrosion due to weather influences, it is not readily accessible in the case of problems, for example, clogging, or repairable or replaceable, and it is also unattractive from an esthetic point of view.

The present invention has for its object to provide an improved construction for a solar collector of the described kind, in which the collecting of gas at the highest point of the solar collector is prevented in a simple and inexpensive manner.

In order to realize this object, the solar collector in accordance with the invention is characterized in that the gas collecting reservoir is in open communication, via a gas exhaust duct, with a constriction which is situated in the duct for the liquid heat transport medium, downstream from the reservoir, and whose cross-sectional flow area is smaller than that of the reservoir.

The flow rate of the liquid in the constriction is higher than that in the gas collecting reservoir. Consequently, the pressure in the constriction is lower than that in the gas collecting reservoir (Bernoulli's law). On the basis of the Venturi effect thus obtained, gas is drawn from the collecting reservoir and is dragged along by the liquid flow in the constriction. If desired, an automatic de-aerating device can now be mounted in a readily accessible position in the duct system connected to the solar collector, notably inside the house whose roof supports the solar collector, said de-aerating device not being subject to weather influences and not spoiling the appearance of the house from an esthetic point of view.

In a preferred embodiment of the solar collector in accordance with the invention, the gas exhaust duct is arranged inside the duct for the liquid heat transport medium. This offers the advantage of a compact construction and hence a smaller risk of leakage or damage.

In accordance with the invention, the end of the gas exhaust duct which opens into the constriction may be provided with one or more circumferential openings. The gas which is drawn into the constriction via the circumferential openings is carried along by the liquid flowing past these openings.

Figure 1B:
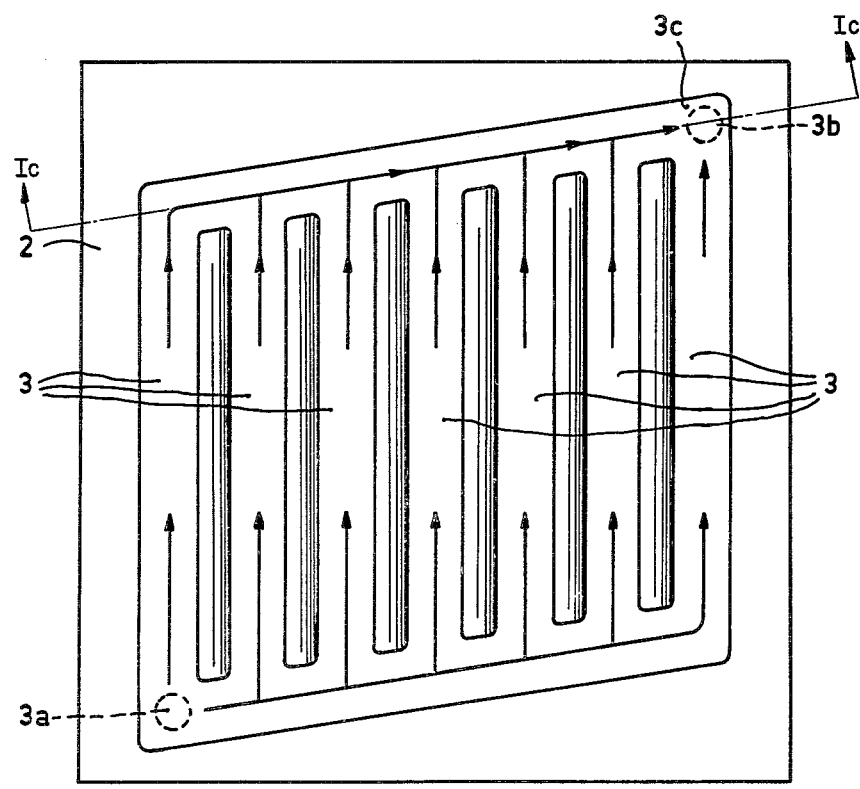
Figures 3, 4:
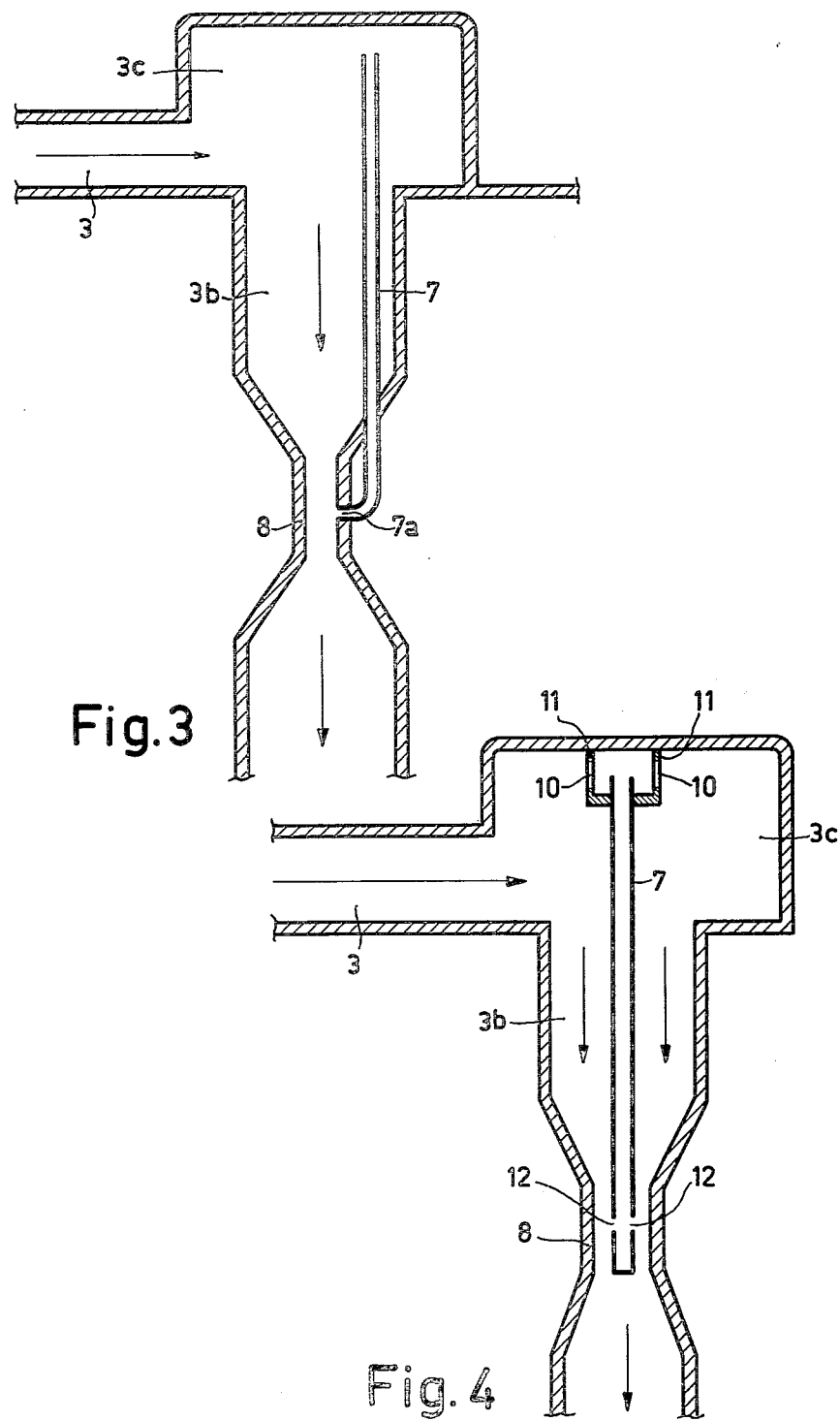
Figure 5A:
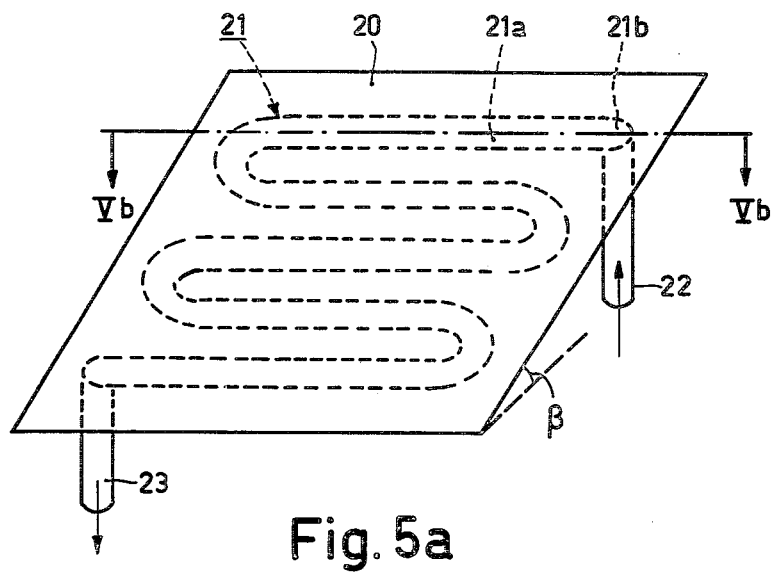
Figure 5B:
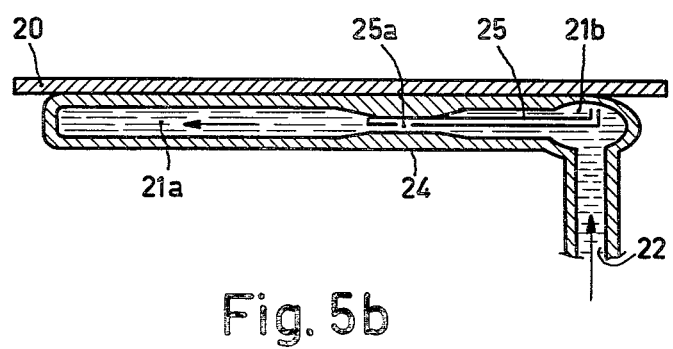
Figures 6, 7:
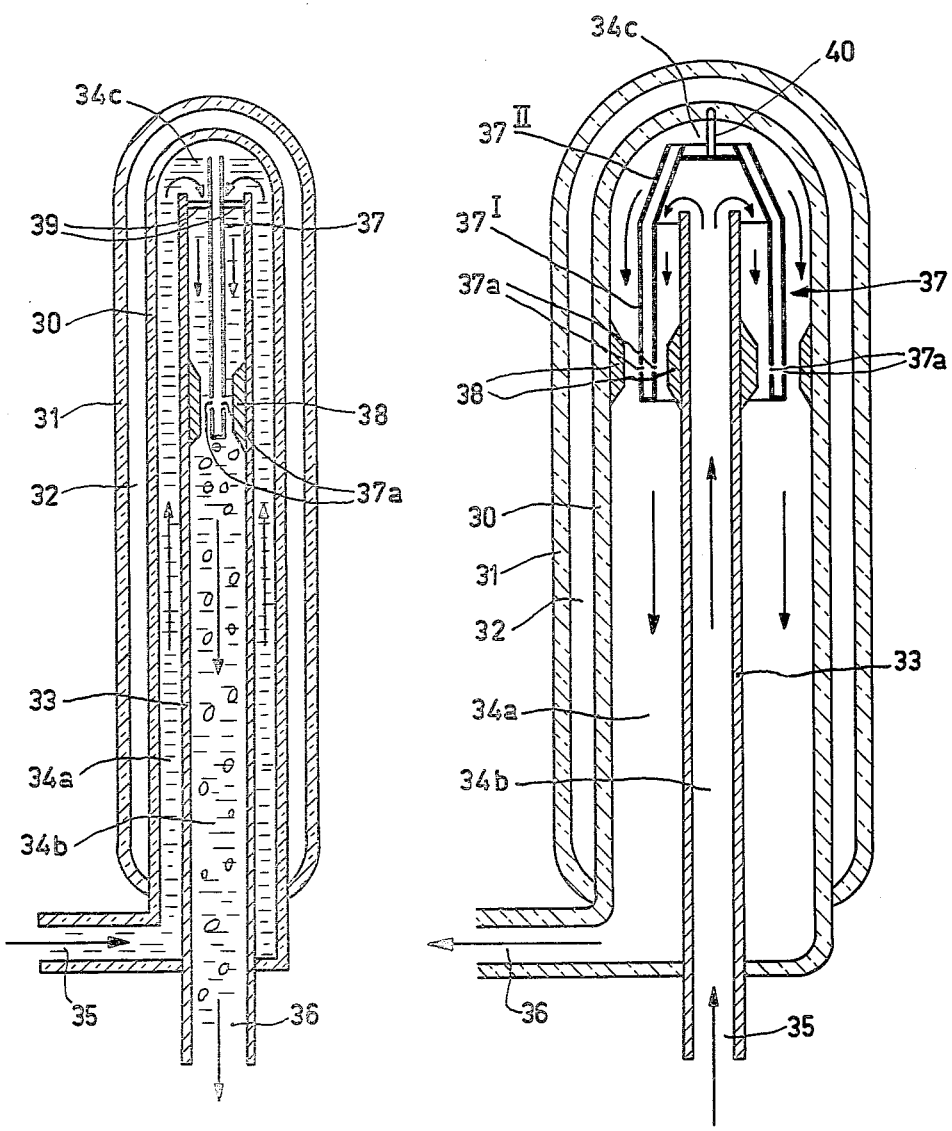

The invention will now be described in detail with reference to the accompanying drawings, in which:

FIG. 1a is a cross-sectional view of a solar collector of the "flat plate" type, FIG. 1b is a plan view of the heat exchanger of the solar collector shown in FIG. 1a, FIG. 1c is a sectional view, taken along the line Ic—Ic of FIG. 1b, and shows the gas exhaust mechanism, FIGS. 2, 3 and 4 show alternative embodiments of the gas exhaust mechanism of FIG. 1c, FIG. 5a is a diagrammatic perspective view of a further type of heat exchanger for a flat plate solar collector, FIG. 5b is a cross-sectional view, taken along the line Vb—Vb of FIG. 5a, of the gas exhaust mechanism, and FIGS. 6 and 7 are longitudinal sectional views of embodiments of a tubular solar collector including a gas exhaust mechanism.

The reference numeral 1 in FIG. 1a denotes a box which accommodates a heat exchanger 2 which is made, for example, of a metal or a synthetic material and which comprises ducts 3 wherethrough a liquid heat transport medium is conducted during operation. The heat exchanger 2 is thermally insulated from the surroundings at its lower side by means of heat insulating material 4, for example, rockwool or glasswool.

Above the heat exchanger 2 there are provided two glass panes 5 and 6 which constitute a heat insulating entrance window for solar radiation.

The upper side of the heat exchanger 2 may be provided in known manner with a selective or non-selective solar radiation absorbing layer, whilst sunlight-transmitting but infrared-reflective layers may be provided in known manner on the panes 5 and 6.

Air or sulphur hexafluoride may be present between the panes 5 and 6. Convection losses can be reduced by the provision of vertical partitions.

The solar radiation which is incident through the panes 5 and 6 during operation is absorbed by the heat exchanger 2 and is transferred in the form of heat to the liquid heat transport medium flowing through the ducts 3, for example, water or glycol. Hereinafter, it is assumed that water is used as the liquid heat transport medium.

FIG. 1b illustrates how one end of the ducts 3 is connected to a common inlet duct 3a, whilst the other end is connected to a common outlet duct 3b. The arrows denote the flow direction of the water.

When the solar collector shown in FIG. 1a is mounted on the sloping roof of a house, parallel to the plane of the roof, in a position (angle α relative to the horizontal) as shown in FIG. 1c, air present in the water flowing through the heat exchanger 2 will collect in the compartment or reservoir 3c formed by the uppermost duct 3 (FIGS. 1b and 1c).

In order to prevent the air collected in the compartment 3c from disturbing or even blocking the passage of water, the compartment 3c is in open communication, via a tube 7, with a constriction 8, the cross-sectional flow area of which is smaller than that of the compartment 3c. The flow rate of the water in the constriction 8, consequently, is higher than that in the compartment 3c, which means that the pressure in the constriction 8 is lower than that in the compartment 3c. Consequently, air collected in the compartment 3c is sucked off via the tube 7 and is carried along by the water passing the opening 7a.

The air carried along can be removed from the system connected to the solar collector in known manner by, e.g., an automatic de-aerating device located in a position which is readily accessible. p In the exhaust mechanism shown in FIG. 2, the tube 7 is arranged inside the duct 3b and is connected to the wall 8a of the constriction 8. The tube 7 is provided with a circumferential opening 9 and is closed at its lower end.

The exhaust mechanism shown in FIG. 3 is substantially identical to that shown in FIG. 1c. The difference consists in that the tube 7 is now passed through the wall of the duct 3b rather than through the wall of the compartment 3c.

In FIG. 4, the tube 7 is centrally arranged inside the duct 3b and the constriction 8; at its upper end it is connected to the wall of the compartment 3c by way of strips 11 which are provided with the holes 10, whilst its lower end is closed and is provided with the circumferential openings 12.

FIG. 5a shows another heat exchanger for a flat plate solar collector. On the lower side of a metal plate 20, made of, for example, copper, a zigzag bent pipe 21 is secured in good thermal contact with the plate 20. The pipe 21 may also be made of, for example, copper.

Pipe 21 forms duct 21a wherethrough water flows during operation; the water enters at the inlet opening 22 and leaves the duct 21a through the outlet opening 23.

During operation, the heat exchanger 20, 21 occupies, for example, the inclined position shown in FIG. 5a (angle $\beta$ relative to the horizontal). The duct portion 21b then acts as a collecting reservoir for the air released from the water. Downstream from the duct portion 21b (FIG. 5b), the duct 21a is provided with constriction 24. Via the pipe 25, air is sucked off from the duct portion 21b by the water flowing through the constriction 24, the air being taken along by the water at the area of the circumferential opening 25a. After having passed the outlet opening 23 (FIG. 5a), the air can be elsewhere removed from the water.

The solar collector shown in FIG. 6 comprises a glass inner tube 30 and a glass outer tube 31 wherebetween an evacuated annular space 32 is present. A pipe 33, made of, for example, a synthetic material or a metal, projects into the inner tube 30, so that a flow duct is formed, comprising an annular duct portion 34a and a central, circle-cylindrical duct portion 34b which communicate via duct portion 34c. The duct portion 34a includes an inlet 35 and the duct portion 34b includes an outlet 36 for a heat transport liquid such as water. The outer wall of the inner tube 30 may be provided with a selective or non-selective solar radiation absorbing layer (for example, copper oxide), whilst the inner wall of the outer tube 31 may be provided with a light-transmitting, but infrared reflective layer (for example, indium oxide doped with tin). Alternatively, the part of the latter inner wall which is remote from the part in which the solar radiation is incident during operation may be provided with a reflective layer, for example, an aluminium mirror.

During operation, the heat absorbed by the inner tube 30 from solar radiation, is transferred to the water flowing through the duct portion 34a. In an operating position of the solar collector in which the duct portion 34c is at a level which is higher than that of the inlet 35 or the outlet 36, this duct portion 34c forms the collecting reservoir for air released from the water. The exhaust mechanism consists of a pipe 37 which at one end projects into the duct portion 34c and which at the other end opens into a constriction 38 in the pipe 33. Water flowing through the constriction 38 sucks air from the duct portion 34c, via the pipe 37, and carries the air along at the area of the circumferential openings 37a. The pipe 37 is connected to the pipe 33 by way of connection strips 39.

Parts of the solar collector shown in FIG. 7 which correspond to parts of the solar collector shown in FIG. 6 are denoted by the same reference numerals. The inlet 35 for water is now associated with the duct portion 34b and the outlet 36 adjoins the duct portion 34a.

The constriction 38 is situated in the duct portion 34a. The exhaust pipe 37 has an annular construction and comprises a cylindrical portion $37^I$ and a conical portion $37^{II}$. The suction of air from the duct portion 34c is effected via the circumferential openings 37a in the inner jacket and the outer jacket of the ring-cylindrical portion $37^I$. The exhaust pipe 37 is connected to the inner tube 30 via a connection element 40 which is sealed in the wall of the inner tube 30.

What is claimed is:

1. A solar collector comprising a heat exchanger which has a duct for transferring heat obtained from incident solar radiation during operation to a liquid heat transport medium conducted through the duct and containing a gas, the solar collector being arranged during operation at an angle relative to the horizontal, said liquid heat transport medium duct thereby including an upper portion constituting a collecting reservoir for gas released from the liquid heat transport medium, a constriction formed in the liquid heat transport medium duct downstream from the collecting reservoir and having a cross-sectional flow area smaller than that of the collecting reservoir, and a gas exhaust duct in open communication between the collecting reservoir and said constriction.

2. A solar collector according to claim 1, in which the gas exhaust duct is arranged inside the liquid heat transport medium duct.

3. A solar collector according to claim 2, in which the end of the gas exhaust duct at the constriction is formed with one or more circumferential openings.

* * * * *